United States Patent [19]

Venero

[11] 4,105,829

[45] Aug. 8, 1978

[54] METAL HALOGEN BATTERIES AND METHOD OF OPERATING SAME

[75] Inventor: Agustin F. Venero, Berkeley Heights, N.J.

[73] Assignee: Exxon Research & Engineering Co., Linden, N.J.

[21] Appl. No.: 674,583

[22] Filed: Apr. 7, 1976

[51] Int. Cl.$^2$ .................. H01M 8/08; H01M 4/60
[52] U.S. Cl. ..................................... 429/15; 429/29; 429/50; 429/101; 429/198; 429/70
[58] Field of Search ................. 429/14, 15, 17, 19, 429/51, 199, 200, 201, 29, 50, 101, 198, 70

[56] References Cited

U.S. PATENT DOCUMENTS

| | | | |
|---|---|---|---|
| 3,816,177 | 6/1974 | Walsh | 429/201 |
| 3,935,024 | 1/1976 | Symons | 429/15 |
| 4,038,459 | 7/1926 | Ajami et al. | 429/15 |
| 4,038,460 | 7/1977 | Walsh et al. | 429/15 |

Primary Examiner—John H. Mack
Assistant Examiner—H. A. Feeley
Attorney, Agent, or Firm—Joseph J. Dvorak

[57] ABSTRACT

A metal halogen cell, especially a zinc-bromine cell, employs a circulating electrolyte system containing a complexing agent to effectively remove cathodic halogen from the electrolyte during charging of the cell. The complexing agent is one which in the presence of halogen forms a water insoluble halogen complex. This separated and stored source of cathodic halogen can be returned to the cell during cell discharge.

14 Claims, 2 Drawing Figures

METAL HALOGEN BATTERIES AND METHOD OF OPERATING SAME

BACKGROUND OF THE INVENTION

1. Field of the Invention

This invention relates to metal halogen cells having an aqueous solution of a metal halide as the electrolyte. In particular, the present invention relates to improved cells and batteries employing a zinc or cadmium anode, a bromine cathode and an aqueous metal halide electrolyte in which the metal of the metal halide is the same as the metal of the anode.

2. The Prior Art

As is well known in the art, electrochemical cells have been proposed which have an electrode with a high positive oxidizing potential and another electrode with a strong negative or reducing potential. Typical of such cells is the metal halogen cell in which the anode material most commonly employed is zinc and the most commonly employed cathodic halogen is bromine. Among the advantages of such cells is their extremely high theoretical energy density. For example, a zinc bromine cell has a theoretical energy density of 200 wh/lb (i.e. watt hours per pound) and an electric potential of about 1.85 volts per cell.

In such a cell the surface of the metal anode, for example, zinc, oxidizes thereby undergoing a positive increase in valence. As a result thereof, zinc atoms are converted to zinc ions which enter the electrolyte according to the equation:

$$Zn \rightarrow Zn^{++} + 2e$$

The chemical reaction occurring at the cathode is expressed by the following equation:

$$Br_2 + 2e \rightarrow Br^-$$

Thus, the overall chemical reaction can be written as follows:

$$Zn + Br_2 \rightleftarrows Zn^{++} + 2Br^-$$

The arrow to the right indicates the direction of the chemical reaction occurring during cell discharge and the arrow to the left indicates the chemical reaction occurring during charging of the cell.

The electrochemical cells of the foregoing type are known to suffer from a number of disadvantages. Most of these disadvantages are associated with side reactions which may occur in such cells. For example, during the charging process free bromine is produced in the cell. This free bromine is available for chemical reaction with the metal anode thereby resulting in auto discharge of the cell. Additionally, there is a tendency for hydrogen gas to be generated when considerable amounts of free bromine are present in the aqueous phase.

The art is replete with efforts on the part of many inventors to overcome the above-mentioned disadvantages. In U.S. Pat. No. 2,566,114, for example, the use of tetraethyl and tetramethyl ammonium bromide for combining with bromine generated during charging of the cell is disclosed. The tetramethyl ammonium salt is added to the powdered carbon surrounding the cathode.

In U.S. Pat. No. 3,738,870 the use of a solid mixture of alkyl ammonium perchlorate and conductive materials such as graphite to form solid addition products with halogen released during charging of such cells is disclosed.

In U.S. Pat. No. 3,811,945 the use of certain alkyl ammonium perchlorates, diamine bromides and diamine perchlorates which are capable of forming solid addition products with cathodic bromine and which are substantially insoluble in water is disclosed.

In contrast to those references which suggest forming solid addition products with bromine, U.S. Pat. No. 3,816,177 discloses the use of a quaternary ammonium halide and a depolarizer in the electrolyte. The depolarizer functions as an organic complexing solvent which dissolves in water and is not reactive toward the halogen or halogens in the cell. The function of the depolarizer apparently is to form water insoluble complex in the presence of quaternary ammonium halides.

As will be readily appreciated, however, even with the use of the aforementioned complexing techniques self-discharge of metal halogen cells will not be totally eliminated since some of the cathodic bromine will remain in the aqueous phase notwithstanding the use of these complexing agents. Indeed, the presence of some halogen is desirable particularly when current is being withdrawn from the cell.

Thus, while the many references cited above show a continuing effort on the part of numerous inventors to overcome the disadvantages associated with metal halogen cells of the type referred to herein, the methods proposed have not adequately overcome the problem encountered in such systems. Consequently, there remains a need for more effective methods for preventing loss of cell capacity and aqueous metal halogen cells.

SUMMARY OF THE INVENTION

Accordingly, in one aspect of the present invention an improved metal bromide cell is provided. Broadly stated, the cell of the invention comprises a housing, a zinc or cadmium anode and a chemically nonreactive electrode. The cell is also provided with an aqueous electrolyte containing metal ions of the same metal as the metal of the anode. The aqueous electrolyte also contains bromine complexing substituents which substituents are soluble in the aqueous electrolyte but which form substantially water insoluble liquids in the presence of the cathodic bromine. This cell is also provided with means for circulating the electrolyte containing complexing substituents to at least the surface of the chemically nonreactive electrode and preferably between the anode and cathode such that during cell charging the substantially insoluble bromine-containing complexes are removed from the cell and stored in a separation zone. During discharging of the cell the substantially water insoluble bromine complex is returned to the chemically nonreactive electrode so as to be in contact with the surface of that electrode.

In the cell of the present invention, it is preferred to also have a separator in the form of porous material or an ion exchange membrane between the anode and the inert electrode; moreover, if the separator means is an ion exchange membrane it is also preferred to provide separate means for circulating electrolyte, i.e. anolyte, through the anolyte compartment and catholyte through the catholyte compartment.

In another aspect of the present invention, there is provided a method of operating a metal bromine secondary cell of the type which includes metal anode of zinc or cadmium, a chemically nonreactive electrode and an electrolyte comprising an aqueous solution of metal bromide, the metal of the metal bromide being the same as the metal of the anode and including complexing substituents which will form a substantially water immiscible liquid complex with bromine, which method comprises contacting the chemically nonreactive electrode with the metal bromide solution while impressing an electric current on the cell thereby generating bromine while circulating said electrolyte from said chemically nonreactive electrode to a separation zone whereby the bromine which has been generated at the chemically nonreactive electrode separates from the aqueous phase in the form of a substantially water immiscible complex with the complexing substituents present in said aqueous phase. During cell discharge the said electrolyte is circulated along with the substantially water immiscible liquid complex of bromine through the cell and in contact with the chemically nonreactive electrode.

These and other features of the present invention will be better understood in view of the following detailed description and accompanying drawings which form a part of the specification and wherein:

DETAILED DESCRIPTION OF THE PREFERRED EMBODIMENTS

Figure 1:
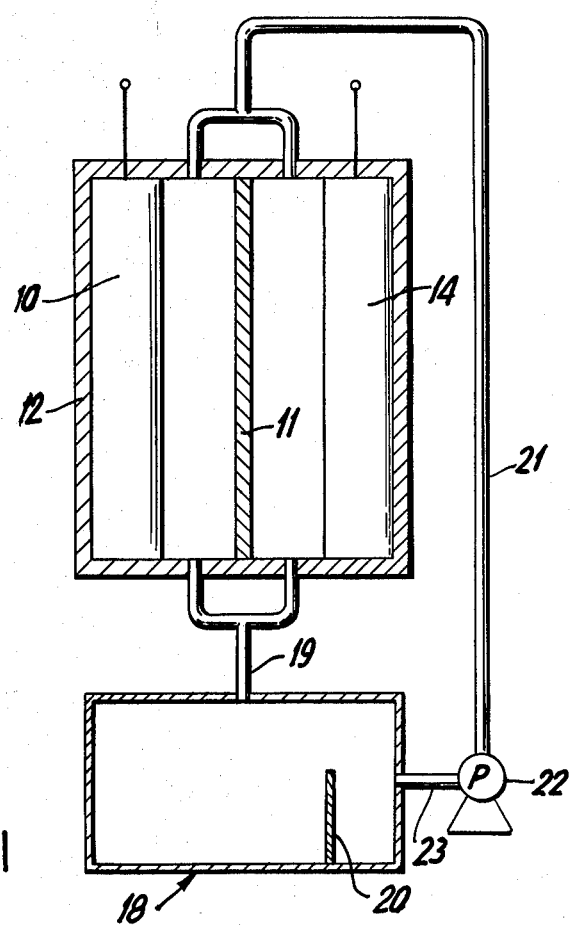
FIG. 1 is a schematic view of one embodiment of the electric cell of the present invention.

Turning first to FIG. 1, there is shown one embodiment of an electrolytic cell of the present invention. As illustrated in the figure, an electrochemical cell of the invention comprises a metal anode 10 disposed in a container or housing 12. The metal anode in accordance with the present invention is selected from zinc and cadmium. It should be noted, however, that it is not absolutely essential that the metal anode be formed solely of zinc or cadmium. Indeed, inert wire mesh or various forms of porous carbon materials upon which zinc or cadmium may be plated can serve very well in forming zinc or cadmium electrodes. Spaced apart from the anode 10 and within housing 12 is a chemically nonreactive or inert electrode 14. Inert electrode 14 is disposed within housing 12 so as to define with the enclosing walls of container 12 and anode 10 an electrolyte chamber. Inert or chemically nonreactive electrode 14 can be formed from a wide range of nonreactive materials such as various forms of electrically conductive and non-corrosive materials including porous carbon, graphite and felt. Indeed high surface area materials containing carbon are particularly effective as inert electrodes in the cells of the invention.

Optionally, the cell is provided with a separator 11. This separator can be any porous material typically used to prevent physical contact of the two electrodes such as fiberglass mats, fiberglass felt, and microporous polymeric materials such as porous polyethylene and the like. The separator 11, in the cell of FIG. 1, merely prevents physical contact of the two electrodes but does not restrict movement of ionic materials in the electrolyte.

As can be seen in FIG. 1, communicating with the electrolyte chamber of the cell is a separation zone. In the FIG. 1 embodiment of the present invention it also can be seen that separation zone consists of a container 18 communicating with the electrolyte compartment of the cell via line 19 and line 21. Lines 19 and 21 are divided so as to assure a good flow of electrolyte through the electrolyte chamber past electrodes 10 and 14; however, it is not essential that the lines 19 and 21 be divided as shown. Additionally and preferably, a dam or baffle 20 is located within container 18 for purposes which will be explained hereinafter. Circulating means such as pump 22 is provided.

Figure 2:
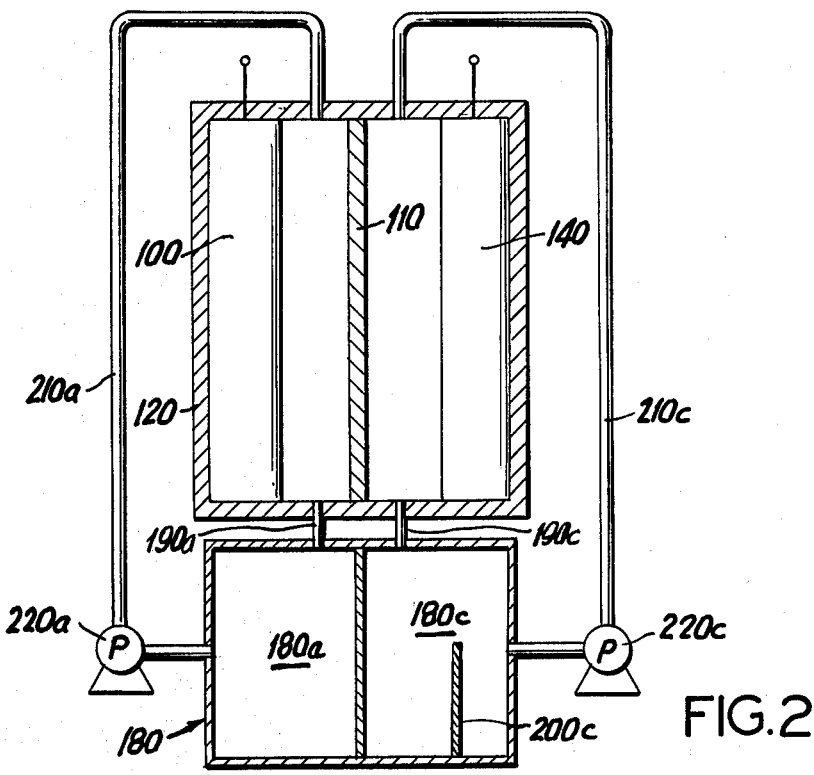
FIG. 2 is a schematic diagram of a second preferred embodiment of the present invention.

Turning now to the embodiment shown in FIG. 2, the electrolytic cell of this invention is provided with an anode 110 within a housing 120. The cell also is provided with an inert counterelectrode 140. The electrodes of the cell in this embodiment are fabricated in the same manner as the corresponding electrodes in the FIG. 1 embodiment. In the FIG. 2 embodiment, however, the separator 110 which prevents physical contact of the anode 100 and the inert electrode 140 preferably is an ion exchange membrane of the cationic type. Thus separator 110 operates to prevent movement of anions such as bromide ion from the cathode compartment to the anode compartment. Separator 110 thereby provides for separate chambers or compartments for electrolyte. Indeed, separate anolyte and separate catholyte can be fed to the cell as will be further explained hereinafter. Cation exchange membranes suitable for separator 110 are well known commercially available materials that consist typically of a matrix crosslinked polymer to which are attached charged radicals such as $-SO_3^-$, $-COO^-$, $-PO_3^=$, $-HOP_2^-$ and the like. The matrix polymer, for example, can be one of any number of polymeric materials such as polyethylene, polystyrene and polyformaldehyde resins. In any event, the cell is provided with catholyte compartment and an anolyte compartment. The holding tank 180 is divided into an anolyte storage zone 180a and a catholyte storage zone 180c. Anolyte storage zone 180a communicates with the anolyte chamber or compartment of the cell via lines 190a and 210a while catholyte storage zone 180c communicates with the catholyte chamber or compartment of the cell via line 190c and 210c. As can be seen in FIG. 2, pump means 220a is provided for circulating anolyte from the anolyte storage zone 180a to the anolyte compartment of the cell. Similarly, pump means 220c is provided for circulating catholyte from the catholyte storage zone 180c to the catholyte compartment of the cell. Also, it should be noted that a baffle 200c optionally but preferably is provided in the catholyte storage zone 180c.

The cell of the present invention employs an aqueous solution of a metal bromide as the electrolyte. As indicated hereinabove, it also is particularly preferred in the practice of the present invention that the metal of the metal bromide be the same metal as the anode. Thus, if a zinc anode is employed the metal bromide is preferably zinc bromide. However, it will be appreciated that when a cell is divided into an anolyte compartment and a catholyte compartment by a cationic exchange membrane separator 110 as shown in FIG. 2 different aqueous salt solutions can be employed for the anolyte and the catholyte. For example, the anolyte may be a metal salt other than a metal bromide, the metal of the salt, of course, being the same metal as the metal of the anode and the catholyte can be a bromide salt of a different metal than the metal of the anode such as an alkali metal.

It is preferred in the practice of the present invention that the separator merely be a physical contacting barrier such as described in relation to separator 11 of FIG. 1. In this mode, a single aqueous metal halide electrolyte is employed.

Generally, the concentration of such salt in the aqueous phase, whether separate anolyte and catholytes are used or a single electrolyte is used, will be in the range of about 0.5 moles/liter to 6.0 moles/liter and preferably between about 2.5 moles/liter to about 3.5 moles/liter prior to charging of the cell. Thus, when a cationic exchange membrane separator such as separator 110 is employed the concentration of the salt in the anolyte will be such as to provide the requisite metal anions in the anolyte in the range of about 0.5 moles/liter to 6.0 moles/liter and preferably 2.5 moles/liter to 3.5 moles/liter; and the concentration of the alkali metal bromide in the catholyte will be such that to provide bromide ions in the range of about 0.5 moles/liter to about 6.0 moles/liter and preferably about 2.5 moles/liter to about 3.5 moles/liter.

The electrolyte of the FIG. 1 embodiment of this invention and at least the catholyte of the FIG. 2 embodiment of the present invention also contains a halogen complexing agent. This bromine complexing agent must be one which is soluble in water and readily forms a complex with bromine, which bromine complex alone or in combination with another material is substantially a water immiscible liquid at temperatures in the range of about 10° C. to about 60° C. The types of halogen complexing agents contemplated by the present invention are water soluble quaternary ammonium salts, particularly halides in which the halide is selected from chloride, bromide and iodide. The substituents of the nitrogen of the quaternary ammonium halides are alkyl, haloalkyl, cycloalkyl or aryl groups or any combination of these functionalities. Quaternary ammonium compounds having the following structural formulas are particularly preferred in the practice of the present invention:

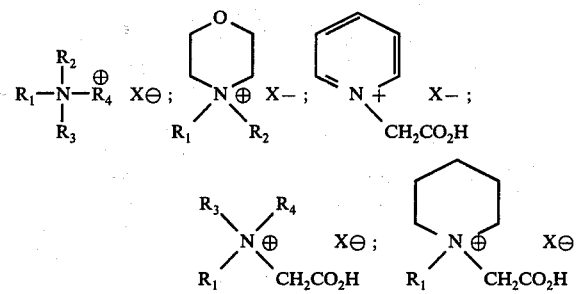

wherein $R_1$, $R_2$, $R_3$ and $R_4$ are different alkyl groups or haloalkyl groups of from about 1 to 8 carbon atoms and $X^-$ is selected from $Cl^-$, $Br^-$ and $I^-$.

As indicated hereinbefore, the chief characteristics of the complexing agent is that they are formed from organo-substituted nitrogen compounds which are water soluble and which are capable of combining with halogen, i.e. bromine. Additionally, the resultant halogen complex must be substantially a water insoluble liquid at normal cell operating temperature, e.g. about 10° C. to about 60° C. Many of the foregoing preferred nitrogen compounds do, in fact, form substantially water insoluble liquid complexes with halogen. Some, however, form solid quaternary ammonium polyhalides which are further complexed by use of suitable complexing solvents thereby resulting in the formation of halogen complexes that are substantially water insoluble and liquid at about 10° C. to about 60° C. Examples of suitable organic complexing solvents are propylene carbonate, dimethyl carbonate, triethyl phosphate, dimethyl sulfate, sulfolane, 1,4-butanesulfane and the like. Indeed, in those instances where the quaternary ammonium compound forms a substantially water insoluble liquid phase with halogen relatively small amounts of the foregoing solvents can be added nonetheless to increase the fluidity of the halogen-containing water insoluble liquid phase.

Operation of the cell of the present invention will now be described using the zinc-bromine couple for the purposes of illustration. Referring first to FIG. 1, an aqueous solution of zinc bromide containing the water soluble complexing agent is circulated by pump 22 through lines 19, 21 and 23 so as to pass through the electrolyte chamber between the electrodes 10 and 14. While the electrolyte is being circulated through the cell an electric current is impressed between the electrodes 10 and 14. This electromotive force (direct current) operates to deposit metallic zinc onto the anode 10 while generating molecular bromine at the chemically inert electrode 14. The bromine generated reacts with the complexing agent to form a substantially water insoluble oil. Since the bromine rich oil is heavier than water it tends to settle on the bottom of the tank 18 and is, therefore, not recirculated, at least in any substantial amount, through the cell during charging. Indeed, baffle 20 in the holding tank helps with the separation of the bromine-containing aqueous insoluble complex. Consequently, substantially an aqueous phase is recirculated through the cell during the charging period. On discharging, however, the oil is flowed back to the cathode by first emulsifying or dispersing it in the aqueous phase. This can be accomplished by mixing means (not shown). For example, a high shear mixer or ultrasonic mixing device can be incorporated within the gravity separator tank. In this instance, activation of the mixing mechanism will be initiated prior to discharge of the cell. Optionally, pipe means (also not shown) for drawing substantially the water insoluble oil from the bottom of the separator tank can be provided. In any event, the bromine phase will be distributed as an emulsion in the aqueous phase and recirculated through electrolyte chamber between electrodes 10 and 14 during cell discharge.

In the operation of the cell shown in FIG. 2, the anolyte containing zinc anions such as an aqueous zinc nitrate solution is circulated through the cell by means of pump 220a. Additionally, the catholyte containing bromide cations such as an aqueous potassium bromide solution is circulated through the catholyte compartment via pump means 220c. The catholyte, of course, also contains a complexing agent for the bromine that is generated. An electronic current is impressed upon the cell. Bromine is generated at the inert electrode 140 and is complexed by the complexing agent forming a water insoluble oil. The water insoluble liquid phase tends to separate at the bottom of the separation tank 180c. During discharge of the cell the water insoluble bromine-containing complex is dispersed in the catholyte by mixing means (not shown) such as a high shear mixer or an ultrasonic mixing device and recirculated through the cell while simultaneously an anolyte is circulated through the anolyte compartment of the cell and the electric current produced is withdrawn.

It will be appreciated that while the present invention is described in connection with a single cell a plurality of cells may be employed in battery fashion.

While not wishing to be bound by any theory, it would appear that dendrite formation that occurs during the charging of zinc-bromine batteries is a function of compositional ingredients in the electrolyte. By flowing the electrolyte or anolyte past the anode, in accordance with the practice of the present invention, the concentration gradients apparently are minimized. In any event, dendrite formation of zinc is substantially avoided.

Additionally, it should be appreciated that self-discharge losses that normally occur in zinc-bromine batteries are substantially avoided as well since only the aqueous phase is recirculated through the cell during the charging period, and on storage, most of the bromine is kept outside of the cell in a holding or separation tank.

Also, as will be readily appreciated, the state of charge of the cell of the present invention can be readily ascertained by a measure of the volume of liquid bromine complex. This is simply achieved by using a graduated holding tank.

The following examples further illustrate the invention.

EXAMPLE 1

An aqueous electrolyte system was prepared having 3.0M $ZnBr_2$, 1.0M N-ethyl,N-methyl morpholinium bromide, 0.59M sulfolane and 0.2M $ZnSO_4$. The electrolyte was circulated between an anode and a counterelectrode each consisting of carbon powder in a plastic binder impressed upon a silver screen current collector. The area of each electrode was 100 cm². A microporous polyethylene sheet material was used as electrode separator. The electrolyte was circulated through the cell and the cell was charged to 80% of the theoretical capacity (5.8 A•hr). The bromine complex during charging was separated outside the cell in the holding tank. The zinc plated on the anode was smooth and in dendrite-free condition. During discharge the oil phase was drawn from the separation tank with some of the aqueous electrolyte and was circulated between the electrodes. Some emulsification of the complex and the aqueous phase was achieved by the mixing action of the circulating pump. The cell performance data is given in Table I below.

TABLE I

| State of charge, % of theoretical | Current Density (mA . cm$^{-2}$) | Cell Potential, volts Charge | Cell Potential, volts Discharge |
| --- | --- | --- | --- |
| 60 | 10 | 1.97 | 1.42 |
|  | 20 | 2.01 | 1.32 |
|  | 30 | 2.07 | 1.19 |
| 80 | 10 | 1.97 | 1.42 |
|  | 20 | 2.01 | 1.34 |
|  | 30 | 2.08 | 1.20 |

EXAMPLE 2

In this test a battery of eight cells connected in series was constructed. The cells had bipolar plates consisting of carbon powder in a polytetrafluoroethylene binder. The electrode area was 100 cm². An ion exchange membrane, sold under the tradename Permion-1010 by RAI Research Corp., was used as the electrode separator. The electrolyte, anolyte and catholyte was an aqueous solution of 3.0M $ZnBr_2$, 1.0M N-methyl,N-ethyl morpholinium bromide and 0.2M $ZnSO_4$. The electrolyte was circulated between the electrodes and the cell was charged at 20 mA•cm$^{-2}$ to 74% of the theoretical capacity (5.4 A•hr). The coil that formed during charging of the cell separated in the catholyte separation tank. During discharge of the cell, the oil was passed with catholyte through a bladeless vortex mixer before being fed through the cell. The coulombic efficiencies for this battery were between 82 and 85%. Good, smooth, dendrite-free deposits of zinc were achieved. Additional cell performance data is given in Table II below.

TABLE II

| State of Charge, % of theoretical | Current Density (mA . cm$^{-2}$) | Cell Potential, volts Discharge |
| --- | --- | --- |
| 74 | 20 | 13.20 |
|  | 30 | 12.67 |
|  | 40 | 12.10 |
|  | 50 | 11.65 |
|  | 60 | 11.15 |

What is claimed is:

1. An electrochemical cell having a metal bromine couple comprising:
   an electrode structure on which to deposit the metal of the metal bromine couple;
   an inert counterelectrode structure at which to generate the bromine of the metal bromine couple;
   an aqueous electrolyte containing a metal bromide and a bromine complexing agent, the metal of said metal bromide being selected from zinc and cadmium, said bromine complexing agent being selected from water soluble organic quaternary ammonium compounds and mixtures of quaternary ammonium compounds with water soluble organic solvents which in the presence of bromine and at temperatures in the range of about 10° C to about 60° C form a substantially water immiscible liquid;
   means for circulating said electrolyte between said electrode structures during charging of the cell;
   a separation zone communicating with said cell whereby bromine complex formed during charging of the cell is separated from said aqueous electrolyte; and,
   means for circulating separated bromine complex from said separation zone to said cell during discharge of said cell.

2. The cell of claim 1 wherein said metal is zinc.

3. The cell of claim 2 wherein said metal is cadmium.

4. The cell of claim 1 whereby said means for circulating separated bromine complex to said cell during discharge of said cell includes mixing means for emulsifying said complex in said electrolyte.

5. The cell of claim 1 including a cationic exchange membrane separator between said electrode and said counterelectrode thereby defining an anolyte compartment and a catholyte compartment;
   means for separately circulating electrolyte through said anolyte compartment and said catholyte compartment during charging of the cell; and,
   said separation zone communicating with said catholyte compartment only.

6. An electrochemical cell comprising:
   a metal anode selected from zinc and cadmium;
   an inert counterelectrode;
   a bromine cathode;
   an aqueous metal bromide electrolyte system, the metal of the metal bromide being the same as the metal of the anode;

a bromine complexing substituent present in said aqueous electrolyte, said complexing substituent being selected from water soluble organic quaternary ammonium compounds and mixtures of quaternary ammonium compounds with water soluble organic solvents, said bromine complexing substituent being one which in the presence of bromine forms a substantially water insoluble liquid at temperatures of about 10° C to about 60° C;

means for circulating said aqueous electrolyte system between said anode and said counterelectrode during charging of the cell;

a holding tank external said cell and communicating therewith whereby liquid bromine complex formed during charging of the cell is removed from said cell and substantially separated from said electrolyte;

mixing means for emulsifying said bromine complex in said electrolyte; and means for circulating liquid bromine complex through said cell during discharge of said cell.

7. The cell of claim 6 wherein the metal anode is zinc.

8. The cell of claim 7 wherein the metal anode is cadmium.

9. An aqueous zinc-bromine electrochemical cell comprising:

a positive electrode and a negative electrode disposed within a housing;

an aqueous zinc bromide solution containing a water soluble quaternary ammonium compound complexing agent which in the presence of bromine forms a substantially water insoluble bromine complex which is liquid at temperatures in the range of about 10° C. to about 60° C.;

a tank external said cell for holding aqueous electrolyte when said cell is in a discharged state and for holding said electrolyte and said bromine complex when said cell is in a charged state;

circulating means communicating with said holding tank and said cell whereby said electrolyte is circulated between said electrodes during charging of said cell and said electrolyte and bromine complex is circulated between said electrodes during discharging of said cell.

10. An aqueous zinc-bromine electrochemical cell comprising:

a positive electrode and a negative electrode disposed in a housing and separated by a cationic exchange membrane thereby defining an anode compartment and a cathode compartment;

an aqueous catholyte containing a source of bromine ions and a complexing agent, said complexing agent being selected from insoluble quaternary ammonium compounds and mixtures of water soluble quaternary ammonium compounds with water soluble organic solvents, said complexing agent being one which in the presence of bromine forms a water insoluble liquid bromine complex at temperatures in the range of 10° C to 60° C;

an aqueous anolyte containing a source of zinc ions;

means for circulating anolyte through said anode compartment;

means for circulating catholyte through said cathode compartment;

a separation zone communicating with said cathode compartment whereby liquid bromine complex is separated from said circulating catholyte during cell charging; and, means for circulating said liquid bromine complex through said cathode compartment during discharging of said cell.

11. A method of operating a metal bromine electrochemical cell comprising:

providing an aqueous electrolyte containing a metal bromide, and a bromine complexing agent, said metal bromide being selected from zinc and cadmium bromides, said bromine complexing agent being selected from water soluble quaternary ammonium compounds and mixtures of quaternary ammonium compounds with water soluble organic solvents which complexing agent in the presence of bromine forms a substantially water insoluble liquid bromine complex at temperatures in the range of 10° C to 60° C;

circulating said aqueous electrolyte between two electrodes while simultaneously impressing an electric potential thereon whereby the metal of the metal bromide is deposited on one electrode substantially free of dendrites and bromine is generated at the other electrode and complexed thereat by said complexing agent;

circulating said bromine complex and said electrolyte through a separation zone whereby said bromine complex is substantially removed from said electrolyte whereby said cell remains substantially in a charged state; and, circulating said bromine complex between said electrodes when withdrawing power from said cell.

12. The method of claim 11 wherein said metal halide is zinc bromide.

13. The method of claim 12 wherein said complexing agent is a quaternary ammonium compound.

14. The method of claim 11 wherein said cell is provided with a cationic exchange membrane separator defining a catholyte compartment and an anolyte compartment and wherein said electrolyte is circulated through the catholyte compartment and an aqueous solution containing metal ions selected from zinc and cadmium is circulated through the anolyte compartment while impressing an electric potential between the two electrodes, and wherein the bromine complex formed and the electrolyte are circulated through said separation zone and said bromine complex is returned to said catholyte compartment when withdrawing power from said cell.

* * * * *